Patented Apr. 17, 1951

2,549,743

UNITED STATES PATENT OFFICE 2,549,743

PROCESS FOR PRESERVING MIXED FOOD

Siegfried Johann Zimmermann, Wallersee, near Salzburg, Austria, assignor to Internationale Aktiengesellschaft für Gassynthesen, Vaduz, Liechtenstein No Drawing. Application July 31, 1947, Serial No. 765,257. In Germany June 10, 1941

Section 1, Public Law 690, August 8, 1946
Patent expires June 10, 1961

3 Claims. (Cl. 99—208)

This invention relates to a process of preserving food, more particularly to a process of manufacturing preserved mixed foods containing meat and vegetable substances.

As is known, foods containing water may be preserved to a great extent by removal of the water therefrom. Such dehydration processes are currently employed particularly for the preservation of vegetables. In such prior processes the dehydrated food on contact with water tended to absorb the water and swell more or less to the original condition. However, heretofore no method has been devised which would permit the dehydration of meat products both in raw and cooked form under such conditions that the product could return to its original swelled or intumesced condition. In the past, in the treatment of meat products if the water was removed to such an extent as to inhibit spoilage the attempts to convert or return the products to their original condition by reabsorption of water produced substances which were not even similar to the original, water-containing products. An example of such prior dried meat products is to be found in the case of typical dried chipped beef.

It has now been found that it is possible to reincorporate or reabsorb water into a dehydrated food and particularly a cooked or uncooked meat product such that the product may be returned to its original hydrous condition and structure.

The major object of the invention therefore is to preserve food, and particularly food containing meat and desirably vegetable substances in such a manner that the food is preserved unspoiled over prolonged periods of time and which may be simply prepared to produce edible dishes having substantially the same physical structure as the original material by a short cooking or heating period in water. Such preserved food mixtures have a peculiar importance for food supplies on expeditions and in areas where food procurement is difficult.

The invention stems broadly from the concept of replacing all or a part of the water normally incorporated or embodied in the tissues or cellular structure of the meat or vegetables by an edible oleaginous material such as an edible fat or oil. According to the invention therefore the process of preserving food or food mixtures containing meat as well as vegetable substances comprises the dehydration preferably of mixtures of precooked animal tissues or vegetable substances and contemporaneously with this dehydration effecting the impregnation or saturation by edible fats such that the hydrophobic fat constituent displaces and replaces all or a preponderant part of the original water content of the food. In carrying out the process the dehydration is preferably effected at elevated temperatures and under any desirable degree of vacuum. The dehydration of the food, as will be appreciated, is carried out in the presence of the edible fat so that the latter is available immediately to replace the evolved water which is being evacuated from the cellular spaces of the food.

With this concept in view it will be appreciated that during the dehydration step the edible fat may be made available for absorption in the food by a number of methods. Thus, during such dehydration the food may be covered with a layer of fat or may be applied to the food by showering, sprinkling or by any other method which will insure the absorption of the edible fat to immediately replace the evaporating water. In a simple method of procedure a layer of edible fat or edible oil is applied over the food to be dried and then the food is dehydrated in the conventional manner by applying heat to vaporize and evolve the water which evolution may be facilitated by the use of a vacuum.

In the case of the preparation of preserved mixed foods containing starchy material such as flour paste or roasted flour the drying period can be shortened by first preparing the dehydrated food mixture containing the meat, vegetables and the like, without the starch addition or binding agent. Thereafter, the starchy material which has been separately dried or roasted may be admixed with the said dehydrated food mixture.

In carrying out the process, as explained, the water may be removed from the animal or vegetable tissues by careful application of heat, that is by heating above the boiling point of water at the prevailing or ambient pressure. By establishing a reduced pressure or vacuum evolution of the water may be accomplished at correspondingly lower temperatures.

The substantially dried or non-aqueous mass thus obtained may be pressed into molded pieces of any desired shape, for example, in the shape of bricks to reduce the volume of the product and to avoid air spaces. The dried mass obtained may be packaged in any desired manner as, for example, by pressing into containers of cardboard or tinned metallic containers.

Such a preserved food is simply and quickly prepared for use by a short cook in a quantity of water equal to or greater than the amount of water removed in the initial dehydration step.

Usually the amount of water used in this step is from one to three times the quantity of the food. Upon cooking for a period of from about 10 to 15 minutes above the melting point of the fat, the fat is largely separated and swims to the top. The product regains its original consistency due to reabsorption of water in the tissues from which the fat is removed. As will be appreciated, the displacement of the fat by water can be accelerated by a further increase in temperature.

The pre-prepared or precooked meals preserved according to the principles of the invention possess substantially the texture of those which heretofore were packaged in undehydrated form in sterilized condition in sealed metallic containers.

The present invention presents, for the first time, a method of removing water from precooked foods, including balanced meals, such that the food will not spoil when exposed to air and which can be prepared for consumption by the simple expedient of heating with a certain amount of water. The foods thus prepared present substantially the same appearance and to a marked extent the same flavor as freshly cooked dishes. The characteristic flavor or taste of food preserved in metallic containers is noticeably absent in the food produced according to the invention.

The invention can be more readily understood and evaluated from a consideration of the following typical illustrative examples.

Example I 2 kilograms of pork are cooked together with 1 kilogram of beans which latter had been previously soaked, with salt, spices, tomatoes and flour paste to obtain a ready meal. One-half a kilogram of molten lard is added to this mass, whereupon the mass is heated in vessels while stirring until all of the water is evaporated. The resulting mass is then pressed in the form of molded pieces as, for example, bricks, or into containers.

Example II 2 kilograms of beef, 2 kilograms of mixed vegetables are cooked with onions, spices and salt to obtain a ragout. Three-quarters of a kilogram of fat, consisting of a mixture of lard and fine-tallow are added to this mass which is thereafter heated in a vacuum drying chamber on flat trays or cups until all of the water is removed. To this dry mass there is admixed a quantity of softened flour which was previously heated with dry heat; the quantity of flour corresponding to the amount of the normal flour paste addition. The mass thus produced is pressed into bricks in suitable molds or into containers.

Example III 1 kilogram of pork and 1 kilogram of smoked meat are cooked together with tomatoes, green paprika, mushrooms, salt, spices, onions and aqueous flour paste. One-half kilogram of lard is added to this mass which is heated in flat trays or cups until all of the water is removed. The removal of the water may be facilitated by drawing off the vapors from the drying chamber by means of a suitable fan. The mass is then pressed to bricks in suitable molds or into containers.

These products may be preserved in this state for a prolonged period of time without danger of spoilage or putrefaction. As previously explained, the precooked ready meals may be prepared for consumption by the simple expedient of heating with water to displace the fat and to restore the water to the tissues of the food. The term edible fatty substance as used in the appended claims is employed to designate edible fats and edible oils.

I claim:

1. A method of preparing preserved food stuffs comprising the steps of preparing ready meals from meat and vegetable materials and heating the said ready meals together with added edible fatty substances to dehydrate the meals and to replace water originally contained therein by the said fatty substances.

2. A method of preparing preserved food stuffs comprising the steps of precooking meat and vegetable materials to form a ready meal and heating the said meals under vacuum in the presence of an edible fat, which is solid at room temperature, to remove water originally contained in said meals and to replace the same by the said fat.

3. An improved, preserved food yielding to a ready dish when heated with water, comprising a dehydrated ready meal including meat and vegetable materials, in which water originally present in said materials is replaced by edible fatty substances.

SIEGFRIED JOHANN ZIMMERMANN.

REFERENCES CITED

The following references are of record in the file of this patent:

UNITED STATES PATENTS

| Number | Name | Date |
|---|---|---|
| 1,929,691 | Hutteman | Oct. 10, 1933 |
| 2,086,072 | Fauth et al. | July 6, 1937 |
| 2,354,495 | Bodenstein | July 25, 1944 |
| 2,439,180 | McKee et al. | Apr. 6, 1948 |

OTHER REFERENCES

"Industrial and Engineering Chemistry," January 1943, article entitled "Dehydration of Meat," by H. R. Kraybill, pages 46 to 50, inclusive.